(12) United States Patent
Goldberg et al.

(10) Patent No.: US 7,774,734 B2
(45) Date of Patent: Aug. 10, 2010

(54) ENHANCED REACH-BASED GRAPH PROCESSING USING SHORTCUTS

(75) Inventors: Andrew V. Goldberg, Redwood City, CA (US); Renato F. Werneck, Princeton, NJ (US); Haim Kaplan, Hod Hasharon (IL)

(73) Assignee: Microsoft Corporation, Redmond, WA (US)

( * ) Notice: Subject to any disclaimer, the term of this patent is extended or adjusted under 35 U.S.C. 154(b) by 332 days.

(21) Appl. No.: 11/593,857

(22) Filed: Nov. 6, 2006

(65) Prior Publication Data

US 2008/0122848 A1 May 29, 2008

(51) Int. Cl.
*G06F 17/50* (2006.01)
(52) U.S. Cl. .............. 716/12; 716/13; 716/14; 701/201; 701/202; 701/203; 701/209
(58) Field of Classification Search ............. 716/12–14; 701/201–203, 209
See application file for complete search history.

(56) References Cited

U.S. PATENT DOCUMENTS

| | | | | |
|---|---|---|---|---|
| 4,905,233 A * | 2/1990 | Cain et al. | ................... | 370/237 |
| 5,179,632 A * | 1/1993 | Masui et al. | ................... | 706/47 |
| 5,243,607 A * | 9/1993 | Masson et al. | ................ | 714/49 |
| 5,880,969 A * | 3/1999 | Hama et al. | ................... | 716/12 |
| 5,971,596 A * | 10/1999 | Nishikawa | .................... | 716/10 |
| 6,038,509 A * | 3/2000 | Poppen et al. | ............... | 701/210 |
| 6,219,823 B1 * | 4/2001 | Hama et al. | ................... | 716/12 |
| 6,230,099 B1 | 5/2001 | Fabian | ....................... | 701/209 |
| 6,311,125 B1 | 10/2001 | Okano et al. | ................ | 701/208 |
| 6,480,785 B1 | 11/2002 | Joerg et al. | .................. | 701/209 |
| 6,633,812 B1 | 10/2003 | Martin et al. | ................ | 701/209 |
| 6,661,797 B1 * | 12/2003 | Goel et al. | ............. | 370/395.21 |
| 6,704,909 B1 * | 3/2004 | Snider | ........................... | 716/1 |
| 7,058,016 B1 * | 6/2006 | Harper | ....................... | 370/238 |
| 7,106,348 B2 * | 9/2006 | Matsumoto et al. | ......... | 345/640 |
| 7,124,032 B2 * | 10/2006 | Wagner | ....................... | 702/19 |
| 2003/0045999 A1 | 3/2003 | Joerg et al. | ................... | 701/209 |
| 2005/0043884 A1 | 2/2005 | Atarashi | ..................... | 701/202 |
| 2005/0251324 A1 | 11/2005 | Wiener et al. | ............... | 701/200 |
| 2006/0047416 A1 | 3/2006 | Goldberg et al. | ............ | 701/202 |
| 2006/0047421 A1 * | 3/2006 | Goldberg et al. | ............ | 701/209 |
| 2006/0161335 A1 * | 7/2006 | Beinhaker | .................... | 701/200 |
| 2007/0150846 A1 * | 6/2007 | Furnish et al. | ................. | 716/8 |
| 2007/0156330 A1 * | 7/2007 | Goldberg et al. | ............ | 701/202 |
| 2008/0216038 A1 * | 9/2008 | Bose | ............................. | 716/8 |

OTHER PUBLICATIONS

Wagner et al. "Drawing Graphs to Speed Up Shortest-Path Computations"; Alenex05; Algorithm Engineering & Experiments; Conference in Vancouver, Canada, Jan. 22, 2005.*

(Continued)

*Primary Examiner*—Naum B Levin
(74) *Attorney, Agent, or Firm*—Woodcock Washburn LLP

(57) ABSTRACT

An algorithm referred to as REAL for the point-to-point shortest path problem combines A* search with landmark-based lower bounds and reach-based pruning. A symbiosis of these techniques is described, which gives a range of time and space tradeoffs, including those that improve both of these complexity measures. Locality is improved and exact reach computation is described.

20 Claims, 11 Drawing Sheets

OTHER PUBLICATIONS

Goldberg et al. "Reach for A: Efficient Point-to-Point Shortest Path Algorithms"; Technical Report MSR-TR-2005-132; Oct. 2005; pp. 1-41.*

Dai, L., "Fast Shortest Path Algorithm for Road Network and Implementation", *Carleton University School of Computer Science*, COMP 4905 Honours Project, Fall Term, 2005, http://www.scs.carleton.ca, 15 pages.

Goldberg, A.V. et al., "Reach for A: Efficient Point-to-Point Shortest Path Algorithms", http://www.avglab.com/andrew/pub/alenex06.pdf, 15 pages.

Goldberg, A.V. et al., "Computing Point-to-Point Shortest Paths from External Memory", http://www.avglab.com/andrew/pub/alenex05.pdf, 15 pages.

* cited by examiner

ENHANCED REACH-BASED GRAPH PROCESSING USING SHORTCUTS

CROSS-REFERENCE TO RELATED APPLICATIONS

This application is related to U.S. patent application Ser. No. 10/925,751, filed Aug. 25, 2004, U.S. patent application Ser. No. 11/115,558, filed Apr. 27, 2005, and U.S. patent application Ser. No. 11/321,349, filed Dec. 29, 2005. These applications are incorporated by reference in their entirety.

BACKGROUND

Existing computer programs known as "road-mapping" programs provide digital maps, often complete with detailed road networks down to the city-street level. Typically, a user can input a location and the road-mapping program will display an on-screen map of the selected location. Several existing road-mapping products typically include the ability to calculate a "best route" between two locations. In other words, the user can input two locations, and the road-mapping program will compute the travel directions from the source location to the destination location. The directions are typically based on distance, travel time, and certain user preferences, such as a speed at which the user likes to drive, or the degree of scenery along the route. Computing the best route between locations may require significant computational time and resources.

Existing road-mapping programs employ variants of a method attributed to E. Dijkstra to compute shortest paths. Dijkstra's method is described by Cormen, Leiserson and Rivest in *Introduction to Algorithms*, MIT Press, 1990, pp. 514-531, which is hereby incorporated by reference in its entirety for all that it teaches without exclusion of any part thereof. Note that in this sense "shortest" means "least cost" because each road segment is assigned a cost or weight not necessarily directly related to the road segment's length. By varying the way the cost is calculated for each road, shortest paths can be generated for the quickest, shortest, or preferred routes.

Dijkstra's original method, however, is not always efficient in practice, due to the large number of locations and possible paths that are scanned. Instead, many modern road-mapping paths use heuristic variations of Dijkstra's method, including A* search (a.k.a. heuristic or goal-directed search) in order to "guide" the shortest-path computation in the right general direction. Such heuristic variations typically involve estimating the weights of paths between intermediate locations and the destination. A good estimate reduces the number of locations and road segments that must be considered by the road-mapping program, resulting in a faster computation of shortest paths; a bad estimate can have the opposite effect, and increase the overall time required to compute shortest paths. If the estimate is a lower-bound on distances with certain properties, A* search computes the optimal (shortest) path. The closer these lower-bounds are to the actual path weights, the better the estimation and the algorithm performance. Lower-bounds that are very close to the actual values being bound are said to be "good." Previously known heuristic variations use lower-bound estimation techniques such as Euclidean distance (i.e., "as the crow flies") between locations, which are not very good.

More recent developments in road mapping algorithms utilize a two-stage process comprising a preprocessing phase and a query phase. During the preprocessing phase the graph or map is subject to an off-line processing such that later real time queries between any two destinations on the graph can be made more efficiently. Previous examples of preprocessing algorithms use geometric information, hierarchical decomposition, and A* search combined with landmark distances.

Gutman improved existing preprocessing algorithms by introducing the concept of graph pruning based on vertex reach. Gutman teaches pruning vertices from a particular search based upon upper bounds of vertex reaches and lower bounds on vertex distances between the search origin and the search destination. Gutman uses Euclidean distances for lower bounds, and combines reach with the existing A* search.

Goldberg and Harrelson have shown that the performance of A* can be improved if landmark-based lower bounds are used instead of Euclidean bounds. These lower bounds are obtained by storing (in the preprocessing step) the distances between every vertex and a small (constant-sized) set of special vertices, the landmarks. During queries, one can use this information, together with the triangle inequality, to obtain lower bounds on the distances between any two vertices in the graph. This leads to the ALT (A* search, landmarks, and triangle inequality) algorithm for the point-to-point problem.

While these methods have resulted in more efficient query phases, these methods are often not practical for very large graphs.

Sanders and Schultes described highway hierarchy and used it to design efficient algorithms for the shortest path problem on road networks. While building the hierarchy structure, these algorithms use a notion of shortcuts. Sanders and Schultes suggested shortcutting not only degree-two vertices, but other vertices of small degree as well.

SUMMARY

Shortcuts are applied in the context of reach-based algorithms and techniques to significantly improve both preprocessing and query efficiency. The resulting algorithms and techniques are referred to as RE. The ALT method may be combined with reach pruning, leading to an algorithm and technique called REAL. Reach-based point-to-point shortest paths algorithms and techniques are improved, and are combined with A* search using landmarks.

Regarding reach-aware landmarks, in REAL, unless s and t are close to each other, the search visits mostly vertices with high reach. Thus it is desirable to have good lower bounds (on distances from the source and to the target) for high-reach vertices. One can keep landmark data for high-reach vertices only. This can significantly reduce the memory requirements of the algorithm while only slightly increasing query times. The space saved by not storing distances from landmarks to low-reach vertices can be used for more landmarks to improve query performance. This allows a wide range of time-memory trade-offs. The time may be reduced along with the space on large graphs. This is achieved by maintaining landmark data for a moderate fraction of vertices and increasing the number of landmarks by a smaller factor.

Additionally, exact reaches may be determined more efficiently than by a standard algorithm, which builds a complete shortest path tree from every vertex in the graph. The improved algorithm accelerates the approximate reach computation.

Moreover, locality may be improved. Since a shortest path computation is largely concentrated on a small number of high-reach vertices, re-ordering vertices by reach leads to more locality and improved performance.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION

The subject matter is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described.

The present invention will be more completely understood through the following detailed description, which should be read in conjunction with the attached drawings. In this description, like numbers refer to similar elements within various embodiments of the present invention. The invention is illustrated as being implemented in a suitable computing environment. Although not required, the invention will be described in the general context of computer-executable instructions, such as procedures, being executed by a personal computer. Generally, procedures include program modules, routines, functions, programs, objects, components, data structures, etc. that perform particular tasks or implement particular abstract data types. Moreover, those skilled in the art will appreciate that the invention may be practiced with other computer system configurations, including handheld devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices. The term computer system may be used to refer to a system of computers such as may be found in a distributed computing environment.

Figure 1:
FIG. 1 is a diagram illustrating an exemplary graph.

The point to point ("P2P") algorithm is directed to finding the shortest path between any two points in a graph. The graph may represent a road map, for example. However, there are many uses for the P2P algorithm, and it is not meant to limit the invention to maps. The P2P algorithm may comprise several stages including a preprocessing stage and a query stage. The preprocessing phase may take as an input a directed graph 100 as illustrated in FIG. 1. Such a graph may be represented by G=(V, E), where V represents the set of vertices in the graph and E represents the set of edges or arcs in the graph. As shown, the graph 100 comprises several vertices labeled s, a, b, and t, as well as several edges labeled x, y, and z. The preprocessing phase may be used to improve the efficiency of a later query stage, for example.

During the query phase, a user may wish to find the shortest path between two particular nodes. The origination node may be known as the source vertex, labeled s, and the destination node may be known as the sink vertex labeled t. For example, an application for the P2P algorithm may be to find the shortest distance between two locations on a highway map. Each destination, or intersection on the map may be represented by one of the nodes, while the particular roads and highways may be represented by an edge. The user may then specify their starting point s and their destination t.

A prior art solution for determining a particular shortest path between s and t is known as Dijkstra's algorithm, which is an implementation of the labeling method. In the labeling method, the shortest paths are determined from a particular source s to all vertices. The algorithm maintains for each vertex its distance label d, its parent vertex p, and a status indicator for that vertex, such as unreached, labeled, or scanned. Initially, for each vertex d is set to infinity, p is set to nil, and status is set to unreached. For the source vertex s, d is set to zero, p to nil, and s to labeled. While there are labeled vertices, the algorithm picks a vertex v, relaxes all arcs out of v, and sets s to scanned. To relax a particular arc from v to some other vertex w, the d value for the vertex w is compared to the sum of the d value for v and the actual length of the arc from v to w. If the d value for w is greater than the sum, then the d value for w is set to the sum, the p value for w is set to v, and the s value is set to labeled. Dijkstra's implementation of the labeling method at each step selects the labeled vertex with the smallest label to scan next. The algorithm finishes with the correct shortest path distances, as well as a shortest path tree $T_s$ induced by the following the parent pointers.

For the purposes of finding the shortest path between s and t, the method described above can be stopped when the vertex t is about to be scanned and the resulting shortest path reconstructed by following the parent pointers from t. Then the path from s to t defined by the parent pointers is the shortest path from s to t. The method can be improved by simultaneously performing Dijkstra's algorithm on the forward and reverse of the graph. The algorithm can then stop when either the forward or backwards algorithm selects a vertex that the other has already scanned.

Figure 2:
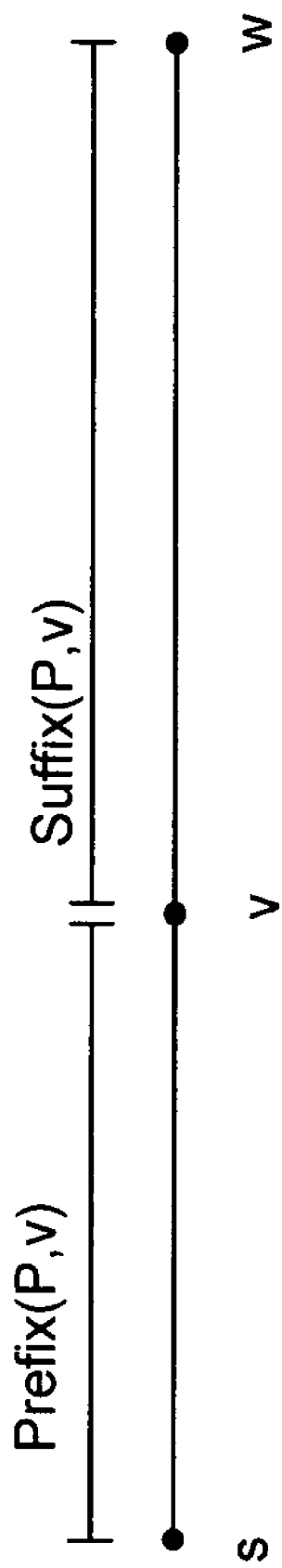
FIG. 2 is a diagram illustrating the prefix and suffix of a path with respect to a vertex.

The concept of vertex reach can be used to further improve Dijkstra's search described above. As illustrated in FIG. 2, given a path P from s to t and vertex v on the path P, the reach of the vertex v, r(v), with respect to the path P is the minimum of the length of the prefix of P (i.e., the subpath from s to v), and the length of the suffix of P (i.e., the subpath from v to t).

The reach of v, r(v), is the maximum, over all of the shortest paths P through v, of the reach of v with respect to P. The prefix of P and the suffix of P with respect to v are illustrated on FIG. 2 as prefix (P,v) and suffix (P,v) respectively.

A simple way to compute the exact reaches of vertices is to compute the all of the shortest paths as described above and apply the definition of vertex reach to the vertices. However, this method is impractical for very large graphs. A more efficient method is to compute an upper bound on the reach of every vertex. The upper bound of the reach on a particular vertex v can be represented by $\bar{r}(v)$. In addition, dist(v, w) can represent the lower bound on the distance from v to w. If $\bar{r}(v)$ is less than dist(s, v) and $\bar{r}(v)$ is less than dist(v, t), then v is not on the shortest path from s to t, and therefore Dijkstra's algorithm may skip the vertex v. Thus, vertices can be pruned from the search space using upper bounds on reaches.

As described above, exact reaches can be easily computed from the shortest paths. However, a better algorithm featuring shortest path trees can also be used. For example, a variable representing the reach of each vertex, r(v), can be established. Its initial value is set to zero, for example. For each vertex x a shortest path tree $T_x$ may be computed. For each vertex v, its reach r(v) with respect to x within the tree is determined, given by its depth (i.e., the distance from the root), and its height (i.e., the distance to its farthest descendant). If the calculated r(v) with respect to x is greater than the r(v) stored in the variable, then the variable is desirably updated to the calculated r(v).

As described previously, to prune Dijkstra's search based on r(v), the lower bounds on the distance from s (i.e., the source) to v and from v to t (i.e., the sink) are desirably calculated. However, lower bounds implicit in the search can also be used to prune the vertex. During the forward direction of the bidirectional Dijkstra's search, a variable Γ can be used to represent the smallest distance label of a vertex scanned in the reverse direction of the search. Therefore, if a particular vertex v has not been scanned in the reverse direction, then Γ represents the lower bound of the distance label from v to the destination t. When v is about to be scanned in the forward direction, then it can be assumed that $d_f(v)$ is the distance from the source s to v. Therefore, the search can be pruned at v if v has not been scanned in the reverse direction, $\bar{r}(v)$ is less than $d_f(v)$, and $\bar{r}(v)$ is less than Γ. Similarly, this applies in the reverse direction. This algorithm is the bidirectional bound algorithm.

Figure 3:
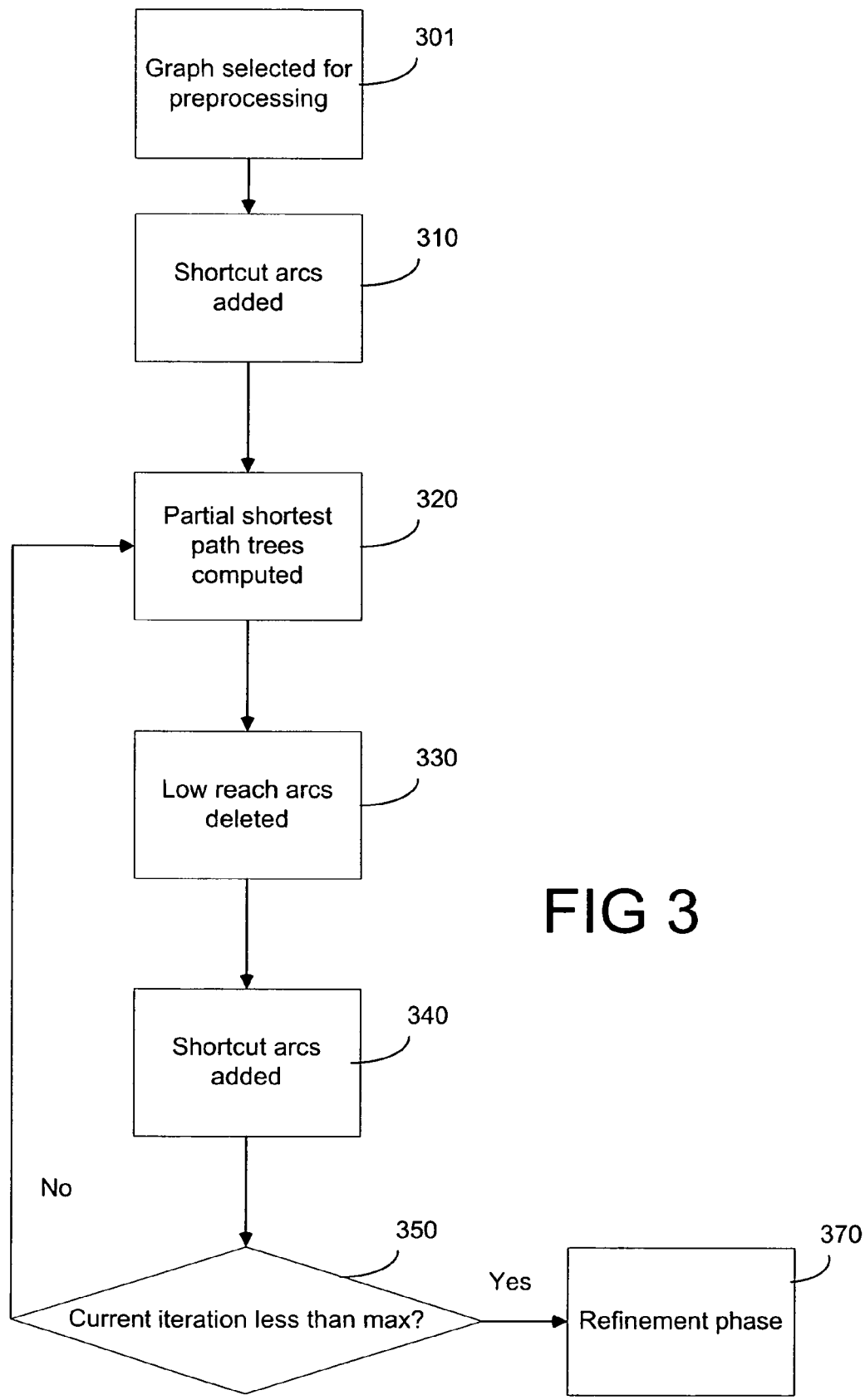
FIG. 3 is a flow diagram illustrating an exemplary method for graph preprocessing.

FIG. 3 illustrates an iterative algorithm for graph preprocessing. Preprocessing the graph desirably removes low-reach arcs to improve the performance of a later query phase. At 301, a graph is selected for processing. The graph comprises a plurality of vertices and arcs. At 310, shortcut arcs are desirably added to the graph to reduce the reach of some arcs and eliminate bypassable vertices. Shortcut arcs, and their generation, are described in further detail with respect to FIG. 4.

At 320, partial shortest path trees are computed for each of the vertices in the graph and the arcs in the graph are divided into a group with small reaches and a group with large reaches. Whether or not a particular arc is considered to be a high or low reach vertex is determined by comparing it to a reach threshold. The reach threshold is desirably a function of the current iteration of the preprocessing algorithm, for example.

At 330, low-reach arcs are desirably removed from the graph. In addition, penalties are added to the graph to replace the deleted arcs. The addition of penalties is necessary to account for deleted arcs in later iterations of the preprocessing algorithm. The addition of penalties is described in more detail below.

At 340, additional shortcuts are added to the current graph. Shortcuts are desirably added to reduce the reach of certain arcs in the graph, thus allowing the graph to shrink faster during preprocessing.

At 350, it is determined if the current iteration of the preprocessing algorithm is the last iteration. The preprocessing algorithm continues iteratively until there are no arcs remaining in the graph. If there are no further iterations to execute (i.e., no remaining arcs), then the algorithm continues at 370 for an optional refinement phase. Else, the current iteration is incremented and the algorithm desirably continues at 320.

At 370, the calculated upper bounds on the reaches of the vertices are desirably recalculated during an optional refinement phase. However, because the iterative portion of the algorithm calculated arc reaches, rather than vertex reaches, the calculated upper bound arc reaches are desirably first converted to vertex reaches. Conversion of arc reaches to vertex reaches is discussed in more detail below. The number of vertices selected for upper bound reach recalculation is desirably determined by a user or administrator, for example.

In order to better understand the preprocessing algorithm the concept of shortcuts arcs are discussed below. Consider the graph illustrated in FIG. 4. The length of segments ab, l(a,b), and cd, l(c,d), are 100, while the length of segment bc is 1. Based on the definition of reach, r(a) and r(d) are both 0, while r(b) and r(c) are 100.

Figure 4:
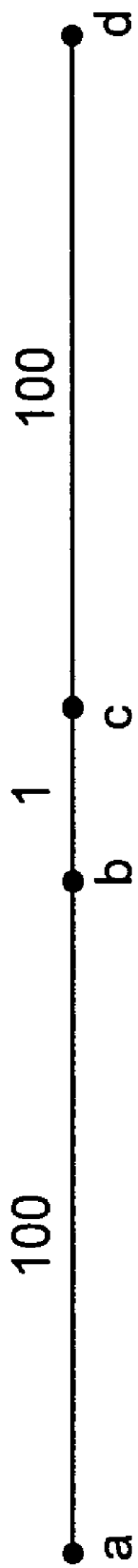
FIG. 4 is a diagram illustrating an exemplary graph.
Figure 5:
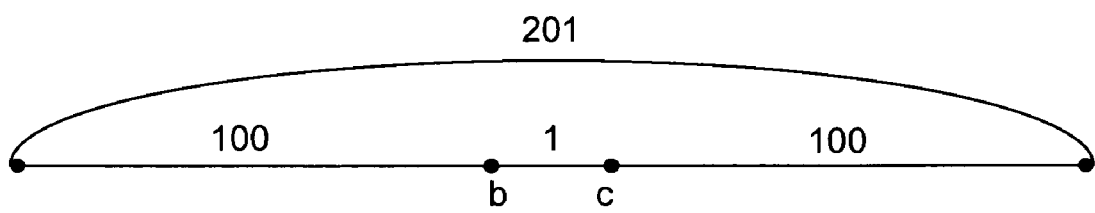
FIG. 5 is a diagram illustrating an exemplary graph with the addition of a shortcut arc.

FIG. 5 illustrates a similar graph as FIG. 4, only a new segment ad is added with l(a,d)=201. None of the reaches of the vertices in FIGS. 4 and 5 are affected by the addition of the new arc. Thus, r(a) and r(d) remain 0, while the r(b) and r(c) remain 100. However, if the new arc is made preferable, the r(b) and r(c) are reduced from 100 to 1.

Given a path P from v to w, a segment or arc(v,w) is a shortcut arc for the path P if the length of the arc is equal to the length of the path P. However, for use in an approximate reach algorithm, such as the partial tree algorithm described above, the concept of a canonical path is necessary. The canonical path is a shortest path with the following additional properties:

1. A canonical path is a simple shortest path.
2. For every source s, and sink t, there is a unique canonical path between s and t.
3. A sub path of a canonical path is a canonical path.
4. Dijkstra's algorithm can find canonical shortest paths.
5. A path Q is not a canonical path if Q contains a sub path P with more than one arc such that the graph contains a shortcut arc for P.

Property 5 is necessary to ensure that adding shortcut arcs decreases vertex reaches.

Canonical paths are implemented by generating a length perturbation, l'(a). While computing the length of a path, lengths and perturbations are separately summed along the path. The perturbations can then be used to break ties in path lengths. Assuming there are no shortcut arcs, if the perturbations are chosen uniformly at random from a large enough range of integers, there is a high probability that all shortest paths will be canonical paths. Shortcut arcs can be added after the perturbations are introduced. The length and the perturbation of a shortcut arc are equal to the sum of the corresponding values for the arcs of the path that is having the shortcuts added. In order to break ties in a graph with shortcuts, the number of hops can be used along with the perturbations.

The preprocessing algorithm computes upper bounds on reaches with respect to the set of canonical paths as defined above using tie breaking by perturbations and hops. These reaches are then used to prune vertices from the graph during a query.

As described previously, partial trees may be used to compute upper bounds on vertex reaches. In order to understand the concept of partial trees, consider a graph such that all shortest paths are unique and therefore canonical, and a parameter $\epsilon$. Vertices in the graph can be partitioned into two groups. A first group with reaches greater than $\epsilon$, and a second group with reaches greater than $\epsilon$. For each vertex x in the graph, Dijkstra's shortest path algorithm is run with an early termination condition. Let T be the current shortest path tree maintained by the algorithm and T' be a subtree of T induced by the scanned vertices. Any path in T' is necessarily a shortest path. The tree construction stops when, for every leaf y of T', one of the following two conditions is true:

1. y is a leaf of T; or
2. if x' is the vertex adjacent to x of the x-y path in T', then the length of the x'-y path in T' is at least 2 $\epsilon$.

Let $T_x$ represent T' when the tree construction stops. The algorithm marks all vertices that have reach of at least $\epsilon$ with respect to a path in $T_x$ as high-reach vertices.

The partial tree algorithm runs in iterations, with the value of $\epsilon$ being multiplied by a constant $\alpha$ for each new iteration. Arc reaches, which are described below, are used instead of vertex reaches, and shortcuts are added at each iteration. During each subsequent iteration the algorithm runs the partial tree step on the resulting subgraph comprising arcs whose reach has been determined to be larger than the current value of $\epsilon$, and penalties incorporated from arcs deleted in previous iterations.

The concept of arc reach is similar to vertex reach as described above. Given a path P from s to t and an arc(v,w) on P, the reach of the arc(v,w) with respect to P is the minimum of the length of the prefix of P from s to w, and the suffix of P from v to t. Similarly, pruning based on arc reaches is similar to pruning based on vertex reaches. While it can be shown that arc reaches are more effective than vertex reaches for reach pruning, they are also more expensive to store. Generally, the number of arcs in a graph is larger than the number of vertices. In addition, because each arc appears in both the forward and reverse graph, either the reach value is duplicated, or some type of stored identifiers must be assigned to the arcs to avoid the duplication. Therefore, arc reaches are desirably used during the offline preprocessing phase, while vertex reaches may be used during the query stage, for example.

Upper bounds for the arc reaches are converted into upper bounds for vertex reaches. For example, consider a vertex v, an arc(v,w) and a path p that determines r(v). In addition, the arc(u,v) and the arc(v,w) are the arcs entering and leaving v on p. The reach of each of these arcs for p must be at least the reach of v, r(v). However, it is not known which of the neighbors of v are the vertices that determine this reach. A bound for the reach of v is the minimum of the highest incoming arc reach (i.e., the reach of the arc from some vertex x to v) and the highest outgoing arc reach (i.e., the reach of the arc from vertex v to some vertex y).

The bound can be improved when the two maximums are achieved for x and y being the same vertex. First, let x' be the vertex for which the maximum over x of r(x,v) is achieved, let y' be the vertex for which the maximum over all y different from x' of r(v,y) is achieved, and let d' be the minimum of r(x',v) and r(v,y'). Second, let y" be the vertex for which the maximum over y of r(v,y) is achieved, let x" be the vertex for which the maximum over all x different from y" of r(x,v) is achieved, and let d" be the minimum of r(x",v) and r(v,y"). Set the bound on r(v) to the maximum of d' and d".

Similarly to vertex reaches, partial trees can be used to find arcs whose reaches are greater than a certain threshold. For a particular graph G, a variable is initialized at zero, for each arc in the graph. Partial trees are then grown for each vertex in G. The reach of the arcs within each partial tree is measured, and where the reach is greater than the reach recorded in the associated variable, the variable is updated with the new reach. The stored reach value for each arc will be the maximum reach observed within all the relevant partial trees.

Note that long arcs can pose an efficiency problem for the partial tree approach. If x has an arc with length 100 $\epsilon$ adjacent to it, the depth of $T_x$ is at least 102$\epsilon$. Therefore building $T_x$ will be expensive. This can be dealt with by building smaller trees in such cases, as described below. This increases the speed of the algorithm at the expense of classifying some low-reach vertices as having high reach.

Consider a partial shortest path tree $T_x$ rooted at a vertex x and let v be a vertex of $T_x$ different from x. Let f(v) be the vertex adjacent to x on the shortest path from x to v. The inner circle of $T_x$ is the set containing the root x and vertices v with the property that d(v)−l(x, f(v)) is less than or equal to a threshold $\epsilon$. Vertices in the inner circle are known as inner vertices, while all other vertices are known as outer vertices. The distance between an outer vertex w and the inner circle is defined as the length of the path between w and the closest inner vertex. The partial tree continues to grow until all labeled vertices are outer vertices and have a distance to the inner circle greater than $\epsilon$.

Once the partial tree is built, the reach can be computed for all arcs originating from the inner circle. The depth of v, depth(v), is defined as the distance from the root x to v within the tree. The height of v, height(v), is defined as the distance from v to its farthest scanned descendant, as long as no descendant is labeled. If there is at least one labeled descendant, then height(x) is infinity. The reach of an arc(u,v) with respect to the tree $T_x$ is defined as $r((u,v), T_x)$ and equal to the minimum of the depth(v) or the sum of the height(v) and the length of the arc. For each inner arc, the calculated reach within the tree is compared with the current estimate, and if it is greater, the estimate is updated.

After all partial trees are grown, every reach estimate with a value at most $\epsilon$ is valid. Arcs with reach estimates less than $\epsilon$ can then be eliminated from the graph. The remaining arcs in the graph all have reach estimates greater than $\epsilon$.

In order to compute valid reach upper bounds for arcs like these, the partial tree algorithm can be modified to take into account the deleted arcs using penalties. For a subgraph of graph G at iteration i, $G_i$, the in-penalty associated with a particular vertex v is defined as the maximum $\bar{r}(u,v)$ for all arcs(u,v) that have been removed from the graph in a previous iteration. Similarly, the out-penalty for a v in $G_i$ is s defined as the maximum $\bar{r}(v,w)$ for all arcs (v,w) that have been removed from the graph in a previous iteration.

Given the partial tree algorithm described above, penalties can be incorporated by redefining depth and height as follows. Given a partial tree $T_x$ rooted at a vertex x, depth(v)=d(v)+in-penalty(x), where d(v) is the distance from x to v in the tree.

In order to redefine height, the concept of pseudo-leaves is introduced. Given a partial tree, for each vertex v in the tree, a new child v' (i.e., the pseudo-leaf) is desirably created along with an arc(v, v') with a length equal to the out-penalty(v). The pseudo-leaf serves as a representative of original arcs not present in the current subgraph. The height of a vertex v is defined as the distance between v and the farthest pseudo-leaf.

Figure 6:
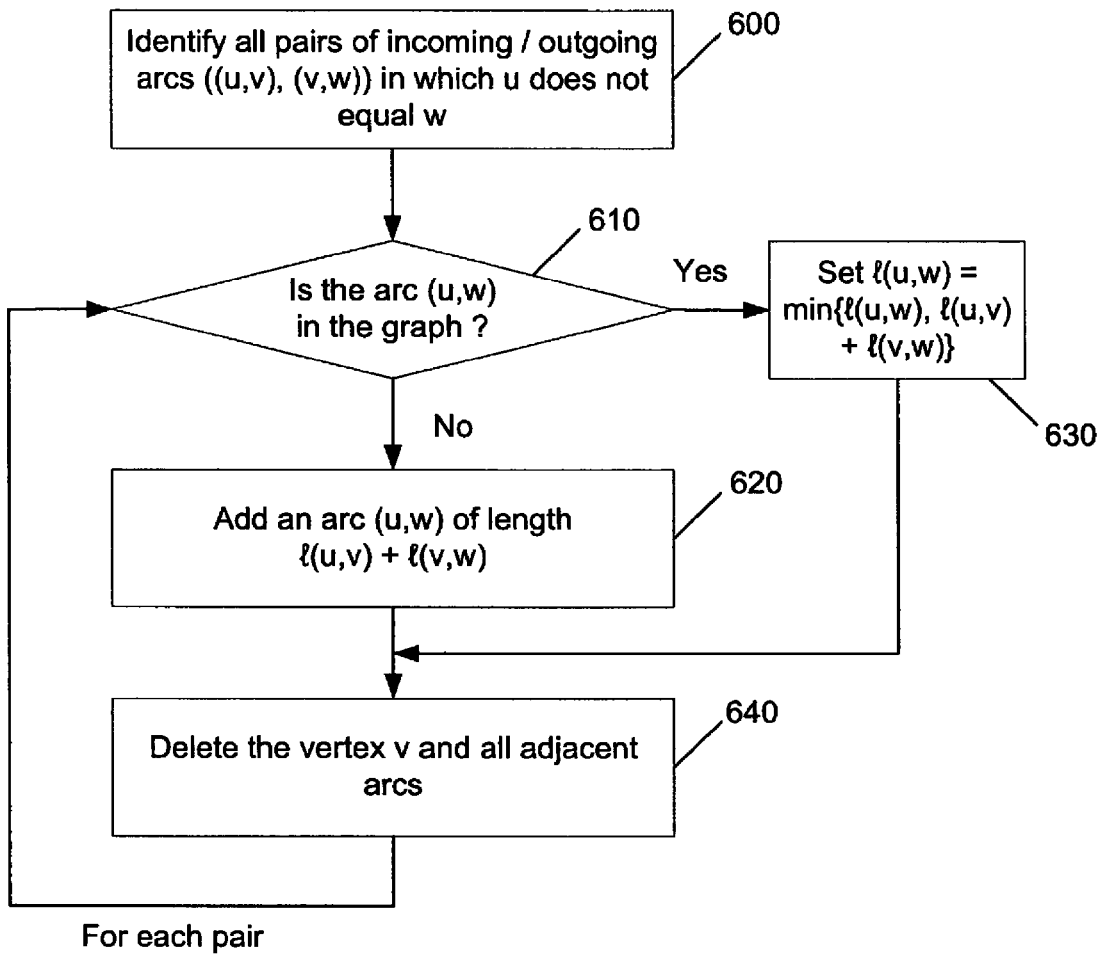
FIG. 6 is a flow diagram of an example method of shortcutting a vertex.

As discussed previously with respect to FIG. 3, the preprocessing algorithm may introduce shortcuts to the graph to eliminate certain vertices. These vertices may be known as bypassable vertices, described further below. FIG. 6 is a flow diagram of an example method of shortcutting a vertex v. At step 600, all pairs of incoming/outgoing arcs ((u,v), (v,w)) with u≠w are examined. For each pair, at step 610, it is determined if the arc (u,w) is in the graph. If the arc is not in the graph, an arc (u,w) of length l(u,v)+l(v,w) is added, at step 620. Otherwise, at step 630, l(u,w) is set equal to min{l(u,w), l(u,v)+l(v,w)}. At step 640, vertex v is deleted along with all arcs adjacent to it.

Consider the ratio $c_v$ between the number of new arcs added and the number of arcs deleted by this procedure. A vertex is deemed bypassable if $c_v \leq c$, where c is a user-defined parameter. Higher values of c will cause the number of vertices to shrink faster, but may increase the size of the graph substantially. Values of c may range from 0.5 to 1.5, for example. For road networks, 0.5 may be used on the first level, 1.0 on the second, and 1.5 on the remaining levels, for example. This prevents the algorithm from adding too many shortcuts at the beginning of the preprocessing algorithm (when the graph is larger but shrinks faster) and ensures that it will shrink fast enough when it gets smaller.

Some additional constraints may be imposed on a vertex v to deem it bypassable (besides having a low value of $c_v$). First, have its degree be bounded by a constant (e.g., 5). This guarantees that the total number of arcs added by the algorithm will be linear in n. In addition, have the length of every new arc introduced and the reach estimate of every arc removed to be bounded by a parameter that depends on the level in which the preprocessing routine is. Long arcs and large penalties can decrease the quality of the reach upper bounds provided by the algorithm. Imposing these additional bypassability criteria prevent such long arcs and large penalties from appearing.

On any given graph, many vertices may be bypassable. When a vertex is bypassed, the fact that existing arcs are removed and new ones are added may affect the bypassability of its neighbors. Therefore, the order in which the vertices are processed matters. In an example algorithm, it is desirable to bypass vertices v with lower values of $c_v$ first in an effort to maximize the number of vertices eliminated.

Since computing the actual value of $c_v$ is somewhat expensive, it is desirable to assign priorities to vertices according to a measure that is easier to compute, but still correlated with $c_v$. For each vertex v, use (indegree(v)−1)·outdegree(v) as an estimate of the number of arcs added while bypassing v. If in- and out-neighbors of v are the same and there are no arcs between them, which is a fairly common case, then this estimate is exact.

Figure 7:
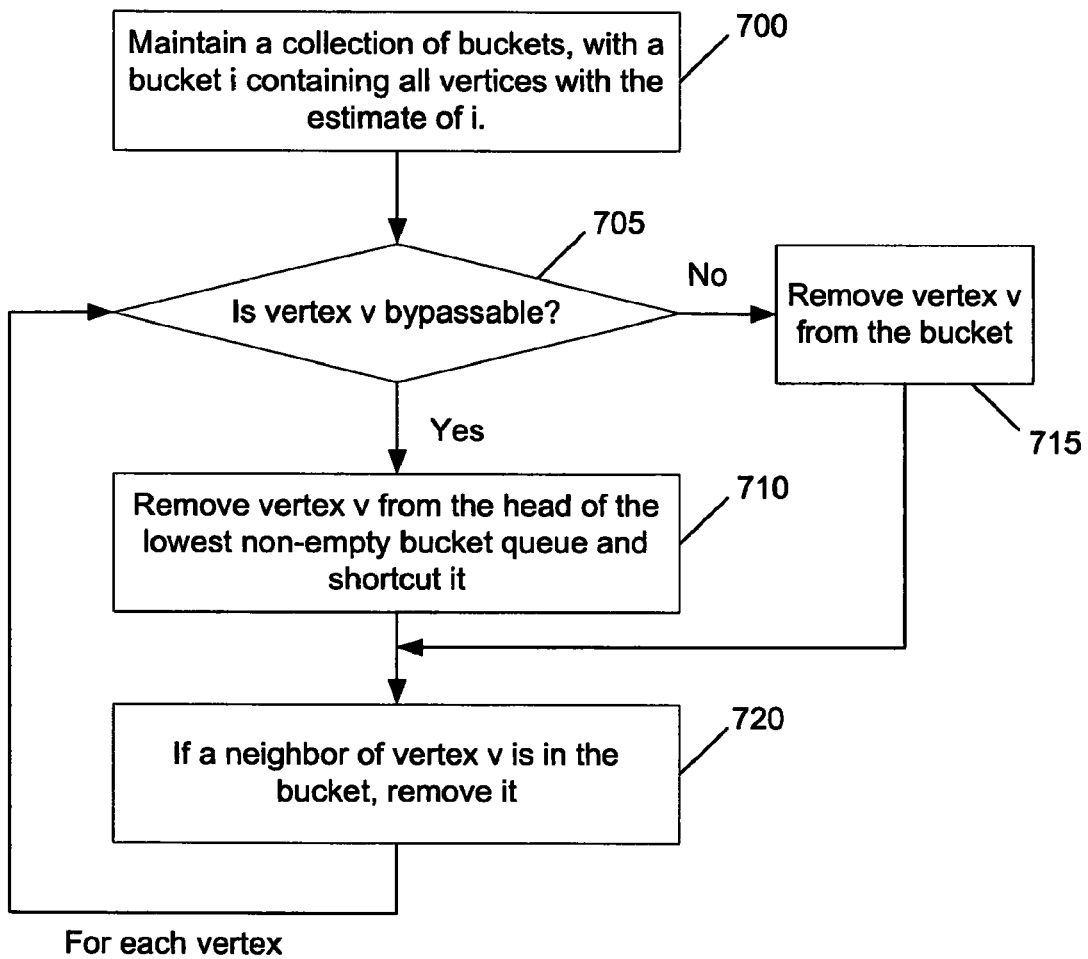
FIG. 7 is a flow diagram of an example preprocessing algorithm method.

FIG. 7 is a flow diagram of an example preprocessing algorithm method. At step 700, a collection of buckets is maintained, with a bucket i containing all vertices with the estimate of i (e.g., up to 15). Vertices in a bucket form a FIFO queue. It is determined at step 705 if a vertex v from the head of the lowest non-empty bucket queue is bypassable. If so, the vertex v is removed from the head of the lowest non-empty bucket queue and shortcutted, at step 710. If it is not bypassable, it is just removed from the bucket, at step 715. In the process, if a neighbor of vertex v is in a bucket, the neighbor is removed at step 720, and, if the new estimate allows it, it is inserted at the tail of the appropriate bucket queue. This is performed even if the estimate for the neighbor does not change. Also, neighbors are inserted that were not in a bucket, but whose estimates decreased to make them belong in a bucket.

FIFO processing of buckets is desirable for shortcutting lines. Consider a line $(p_0, p_1, \ldots, p_k)$, where for 0<i<k, the only arcs adjacent to $p_i$ are $(p_i-1, p_i)$ and $(p_i, p_i+1)$. If vertices $p_1, \ldots, p_{k-1}$ are processed in order, an undesirable set of shortcuts is obtained: $(p_0, p_1), (p_0, p_2), \ldots, (p_0, p_k)$. This causes the degree of $p_0$ to be too high and does not reduce the reaches of internal vertices as much as it could. FIFO processing produces a more balanced sequence of shortcuts.

As described previously with respect to FIG. 3, the preprocessing algorithm desirably comprises a refinement phase to correct for increasing penalties. As discussed above, penalties are introduced to the graph to compute valid upper bounds where vertices have been deleted. However, as the algorithm progresses these bounds become less tight because the penalties increase. As a consequence, the additive errors may become larger for vertices that remain in the graph after several iterations.

To better correct for the additive errors, a refinement step may be included in the preprocessing algorithm. After finding the upper bounds using the partial trees, the refinement step desirably re-computes the reaches of a predetermined number of the vertices with the highest reach upper bounds. The subgraph comprising the set of high reach vertices and associated arcs is selected from the graph. The number of vertices selected is determined by the desired time for the refinement phase. For example, a run time of approximately 30% of the main preprocessing phase may be appropriate. This subgraph has desirably been through several iterations of the shortcut step, and desirably comprises original arcs, as well as additional shortcut arcs added during the shortcut step.

After selecting the subgraph comprising the high reach vertices, an exact reach computation may be performed on the vertices in the subgraph. The exact reaches may be computed by growing complete shortest path trees. Because these shortest path trees are only ran from each vertex in the subgraph, the in and out-penalties for the additional vertices in the graph should also be considered.

Regarding A* search and ALT algorithms, assume it is desirable to find the shortest path from s to t. Let $\pi_f$ be a (perhaps domain-specific) potential function such that $\pi_f(v)$ gives an estimate on the distance from v to t. A* search is an algorithm that works like Dijkstra's algorithm, except that at each step it selects a labeled vertex v with the smallest key, defined as $k_f(v)=d_f(v)+\pi_f(v)$, to scan next. A* search is equivalent to Dijkstra's algorithm on the graph with length function $l_{\pi_f}=l(v,w)-\pi_f(w)+\pi_f(v)$. If $\pi_f$ is such that $l_{\pi_f}$ is non-negative for all arcs (i.e., if $\pi_f$ is feasible), the algorithm will find the correct shortest paths. The class of A* search algorithms that use a feasible function $\pi_f$ with $\pi_f(t)=0$ is referred to as lower-bounding algorithms.

A* search and bidirectional search may be combined as follows. Let $\pi_f$ be the potential function used in the forward search and let $\pi_r$ be the one used in the reverse search. Since the latter works in the reverse graph, each original arc (v,w) appears as (w, v), and its reduced cost with respect to $\pi_r$ is $l_{\pi_r}(w, v)=l(v,w)-\pi_r(w)+\pi_r(v)$, where l(v,w) is in the original graph. $\pi_f$ and $\pi_r$ are consistent if, for all arcs (v,w), $l_{\pi_f}(v,w)$ in the original graph is equal to $l_{\pi_r}(w, v)$ in the reverse graph. This is equivalent to $\pi_f+\pi_r=$const.

If $\pi_f$ and $\pi_r$ are not consistent, the forward and reverse searches use different length functions. When the searches meet, there is no guarantee that the shortest path has been found. Assume $\pi_f$ and $\pi_r$ give lower bounds to the sink and from the source, respectively. Using an average function, feasible and consistent lower bounds may be obtained.

ALT (A* search, landmarks, and triangle inequality) algorithms use landmarks and triangle inequality to compute feasible lower bounds. A small subset of vertices is selected as landmarks and, for each vertex in the graph, distances to and from every landmark are precomputed. Consider a landmark L: if $d(\cdot)$ is the distance to L, then by the triangle inequality, $d(v)-d(w) \leq dist(v, w)$; if $d(\cdot)$ is the distance from L, $d(w)-d(v) \leq dist(v, w)$. To get the tightest lower bound, one can take the maximum of these bounds, over all landmarks. The best lower bounds on dist (v, w) are given by landmarks that appear "before" v or "after" w.

During an s-t shortest path computation, it is desirable to use only a subset of the available landmarks: those that give the highest lower bounds on the s-t distance. This tends to improve performance because most remaining landmarks are unlikely to help in this computation.

An ALT technique may comprise a main stage and a preprocessing stage. The main stage may be improved by using dynamic selection of active landmarks, and the preprocessing stage may be improved by using various landmark selection techniques. As described further herein, during preprocessing, the ALT algorithm selects a set of landmarks and precomputes distances between each landmark and all vertices. Then it uses these distances to compute lower bounds for an A* search-based shortest path algorithm.

The reach-based graph pruning described herein can be combined with A* search.

During the A* search, when a vertex v is about to be scanned, the length of the shortest path from the source s to v is extracted from the key of v. If the calculated reach of v is smaller than both $d_f(v)$ and $\pi_f(v)$, the search can be pruned at v.

Although A* search uses transformed lengths, the shortest paths remain invariant. This applies to bidirectional search as well. In this case, use $d_f(v)$ and $\pi_f(v)$ to prune in the forward direction, and $d_r(v)$ and $\pi_r(v)$ to prune in the reverse direction. Using pruning by reach does not affect the stopping condition of the algorithm. The usual condition for A* search is used, which is similar to that of the standard bidirectional Dijkstra, but has reduced costs. The implementation of the bidirectional A* search algorithm with landmarks and reach-based pruning is referred to as REAL. As for ALT, a version of REAL is used that balances the work of the forward search and the reverse search. Implicit bounds cannot be used with A* search to prune by reach, but landmark bounds can.

Note that REAL has two preprocessing algorithms: the one used by RE (which computes shortcuts and reaches) and the one used by ALT (which chooses landmarks and computes distances from all vertices to it). These two procedures can be independent from each other: since shortcuts do not change distances, landmarks can be generated regardless of what shortcuts are added. Furthermore, the query is still independent of the preprocessing algorithm: the query only takes as input the graph with shortcuts, the reach values, and the distances to and from landmarks.

It is desirable to take reaches into account when generating landmarks. The preprocessing and query performance of the techniques can be improved.

A typical point-to-point query spends most of its time scanning high-reach vertices. Except at the very beginning of the search, low-reach vertices are pruned by reach. An optimization may be achieved by, during preprocessing, reordering the vertices such that high-reach vertices are close together in memory to improve cache locality.

One way to achieve this would be to sort vertices in non-increasing order of reach. This, however, will destroy locality of the input: many applications (including road networks) have vertex ordering with high locality.

Figure 8:
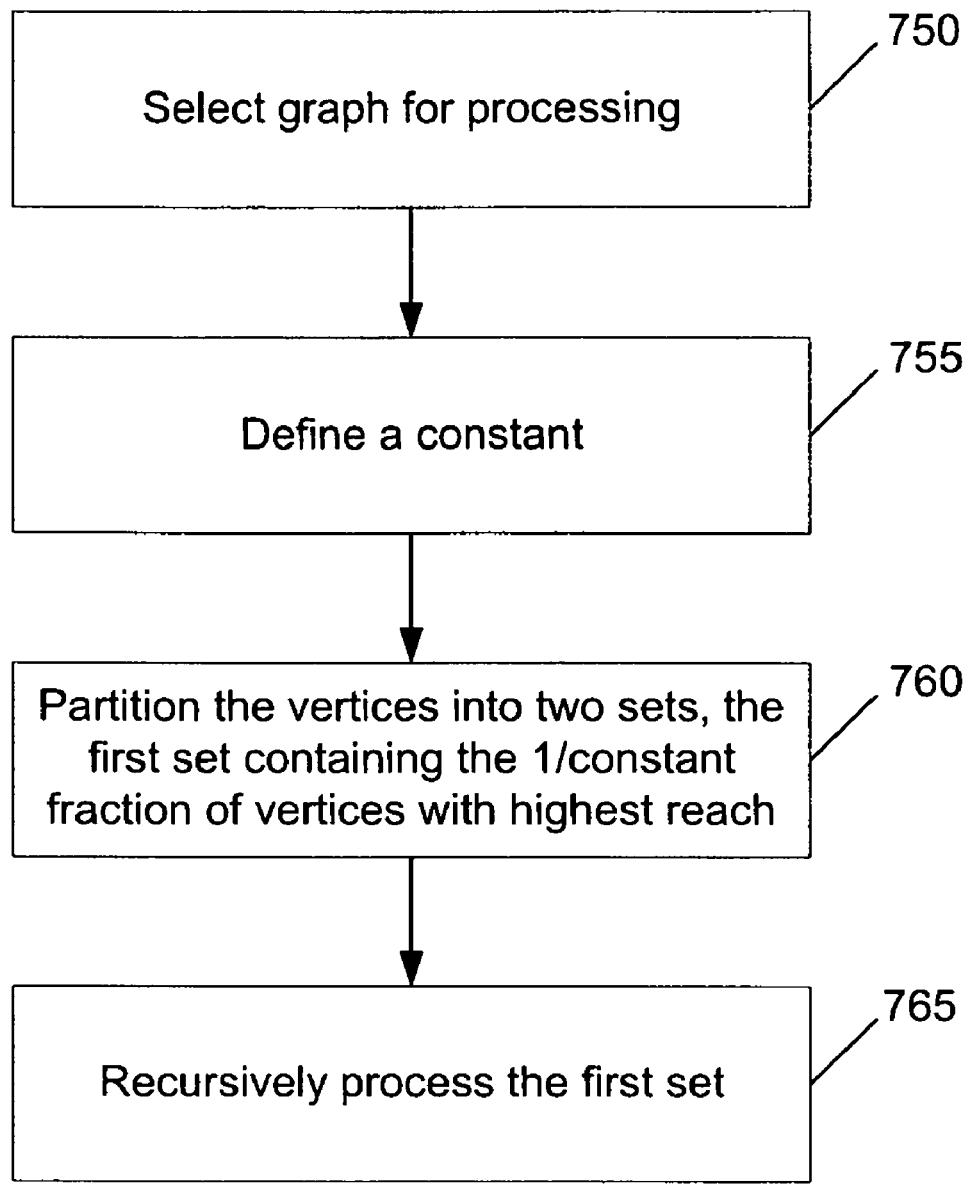
FIG. 8 is a flow diagram of another example method for graph preprocessing that improves locality.

Instead, the following approach, described with respect to the flow diagram of FIG. 8, may be used to order the vertices. At step 750, a graph is selected for processing. The graph comprises a plurality of vertices and arcs. A constant $\alpha > 1$ (e.g., $\alpha = 2$) is set at step 755. (A desirable value of $\alpha$ can be determined experimentally, for example.) The vertices are partitioned into two sets at step 760. The first desirably contains the $1/\alpha$ fraction of vertices with highest reach, and the other contains the remaining vertices. The original ordering is retained in each part, and then the first part is recursively processed at step 765 as described above, for example. This results in re-ordering of vertices that preserves much of the input data locality while placing high-reach vertices close to each other. The re-ordering may also facilitate other optimizations, such as those described below.

The interaction of landmarks and reaches may be used to improve performance. memory requirements of the algorithm may be improved by storing landmark distances only for high-reach vertices. However, this results in some degradation in query performance. By adding more landmarks, an even wider range of trade-offs between query performance and memory requirement is obtained. This technique is referred to as the partial landmark algorithm.

Figure 9:
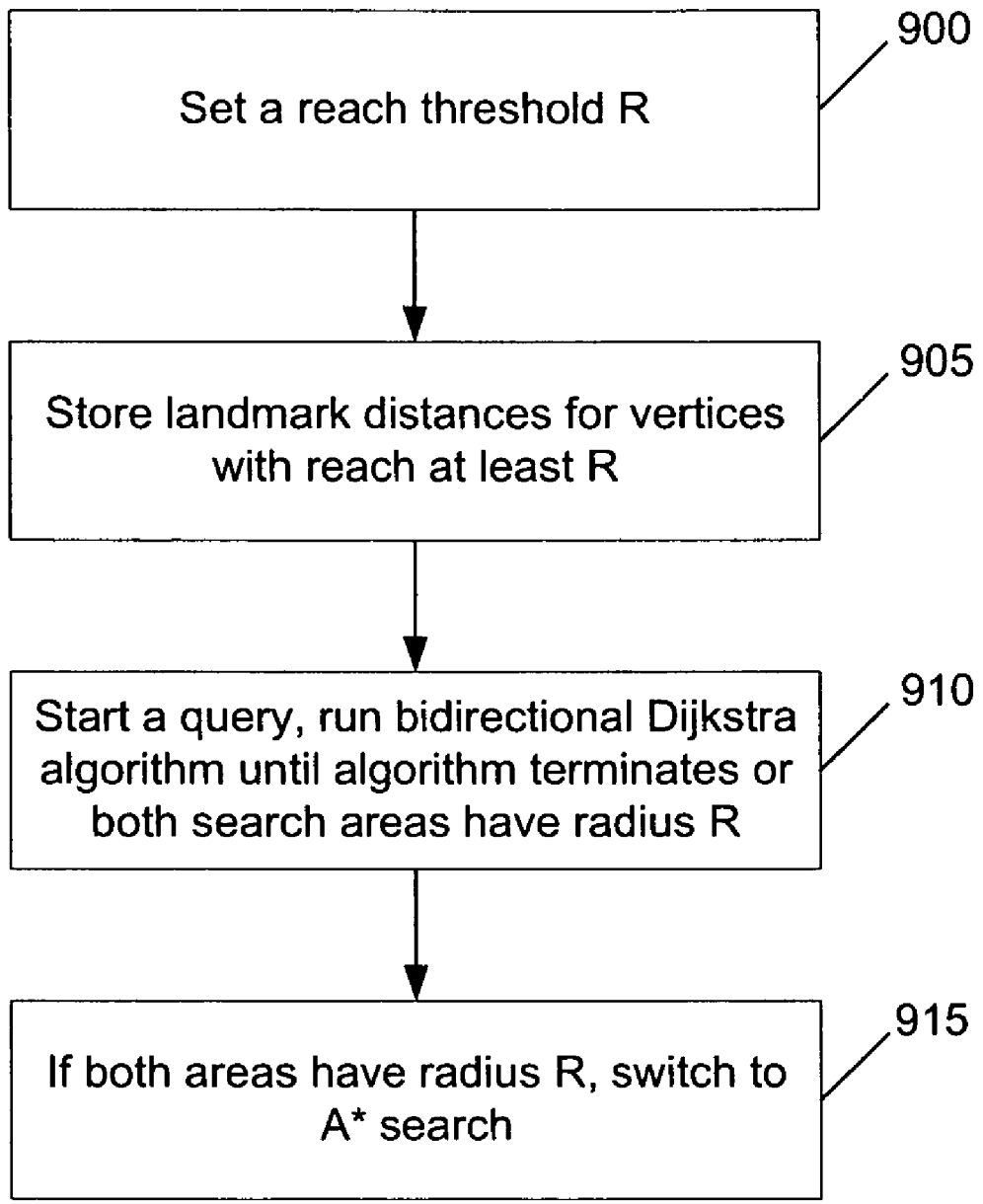
FIG. 9 is a flow diagram of an example partial landmark technique.

Queries for the partial landmark algorithm work as follows and are described with respect to the flow diagram of FIG. 9. During preprocessing, set a reach threshold R at step 900, and store landmark distances for vertices with reach at least R (high reach) at step 905. At step 910, a query is started by running the bidirectional Dijkstra algorithm, with reach pruning but without using A* search, until either the algorithm terminates or both search areas have radius R. In the latter case, from this point on, only vertices with reach R or more are examined. More particularly, when both search areas have radius R, at step 915, switch to the combination of reach-based pruning and A* search by removing labeled vertices from the heaps and re-inserting them using new keys that incorporate lower bound values.

Note, however, that s or t may have low reach, so it is desirably specified how to compute lower bounds between low- and high-reach vertices. Suppose s has low reach (t is treated symmetrically). If the algorithm does not terminate during the initial phase and t is reachable from s, then some other high-reach vertex s' is used as a proxy for computing lower bounds on distances to and from s.

For a given landmark L, the lower bound on the distance from s to a high-reach vertex v may be obtained using distances to the landmark, and can be computed as follows:

$$dist(s, v) \geq dist(s', L) - dist(v, L) - dist(s', s). \quad (1)$$

It is noted that this lower bound is needed by the backwards search, as it is a lower bound on the distance from v to s in the reverse graph.

Similarly, a lower bound on the distance from s to v can be obtained using distances from landmarks:

$$dist(s, v) \geq dist(L, v) - dist(L, s') - dist(s', s). \quad (2)$$

Note that while doing the forward search, dist(s, s') is known, but to compute the lower bounds (1) and (2), dist(s', s) is needed. The proxy s', however, does not depend on the target node t, one can assign a proxy s' to each low reach vertex s and compute dist(s', s) while reading the graph for queries. Two executions of a multiple-source version of Dijkstra's algorithm (one in the forward graph and one in the reverse graph) suffice to compute the desired information.

The quality of the lower bounds obtained by the partial landmark algorithm depends not only on the number of landmarks available, but also on the value of R. In general, the higher the reach threshold, the farther the proxy s' will be from s (and t' from t), thus undermining the accuracy of the lower bounds. If all landmark distances are available, R will be zero, and the algorithm will behave exactly as the REAL method. By decreasing the number of distances per landmark (representing distances only to higher-reach vertices), R will increase; a trade-off between memory usage and query efficiency is thus established.

Both memory usage and query times can be improved. Starting from the base algorithm, the number of landmarks may be increased while decreasing the number of distances per landmark so that the total memory usage is lower. On large road networks, the availability of more landmarks makes up for the fact that only a fraction of all distances is available, and query times improve.

In an example implementation, an "avoid" algorithm may be used to select landmarks. An example avoid method works by adding one landmark at a time. In each iteration, a landmark is selected in a region that is still not well-covered by existing landmarks. A complete shortest path tree is built, rooted at a vertex r picked in a randomized fashion. Then a weight is assigned to each vertex v, which depends on how good the lower bound on the distance from r to v (based on previously selected landmarks) is. Vertices with bad lower bounds will have higher weights. The algorithm then determines the vertex p that, among all vertices that have no landmark as a descendent, maximizes the sum of the weights of its descendents in the shortest path tree. A leaf of the subtree rooted at p is then picked as the new landmark.

Computing the lower bounds on the distance from r to a particular vertex takes time proportional to the number of landmarks already selected, which makes avoid quadratic in the number k of landmarks. A modification may be made to make the algorithm linear in the number of landmarks. When processing the shortest path tree rooted at r, define the weight of v to be the difference between the distance from r to v and the current lower bound on this distance, but only if v is one of the first n/k vertices in the graph. For all other vertices, define the weight as zero. Because vertices are desirably approximately sorted in decreasing order of reach, this means that only the vertices with higher reach are taken into account. This change makes the algorithm substantially faster, with no discernible decrease in solution quality.

Figure 10:
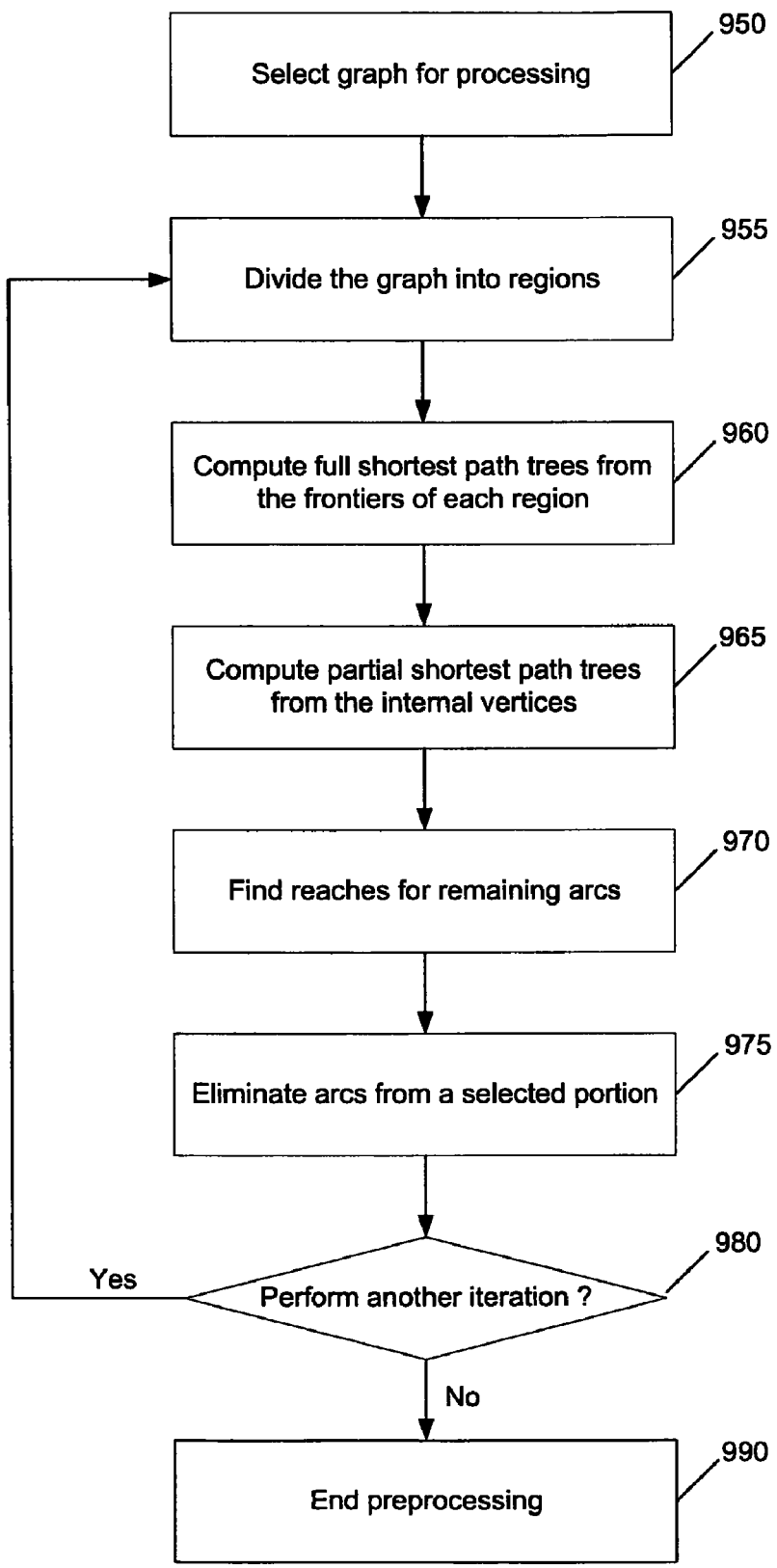
FIG. 10 is a flow diagram of another example method for graph preprocessing that provides exact reach computation.

FIG. 10 is a flow diagram of another example method for graph preprocessing that provides exact reach computation. A technique is described for computing exact reaches that is more efficient than the standard algorithm which builds a complete shortest path tree from every vertex in the graph.

The improved algorithm accelerates the approximate reach computation. More particularly, as the preprocessing algorithm proceeds, the partial trees become large relative to the graph size, which makes the computation slower. Therefore, when the graph is small enough, computing exact reaches is more cost-effective. It produces accurate reaches even faster than the partial trees algorithm does.

At step 950, a graph is selected for processing. The graph comprises a plurality of vertices and arcs. Shortcut arcs may be added to the graph to reduce the reach of some arcs and eliminate bypassable vertices. An example exact reach algorithm constructs a complete shortest path tree from each vertex in the graph. However, this is not efficient. A more efficient technique first divides the graph into regions at step 955. At step 960, full shortest path trees are computed from the frontiers of each region, and at step 965 partial shortest path trees are computed from the internal vertices reusing parts of the trees rooted at the frontier.

Having a faster exact algorithm allows a switch to be made to the exact algorithm earlier when the graph is larger. Specifically, a switch is desirably made when either of two conditions is satisfied: (1) the number of remaining vertices is less than ($10\sqrt{n}$), or (2) after a level in which the average size of the partial tree was greater than one eighth of the total number of remaining vertices, for example.

The algorithm finds reaches for all remaining arcs at step 970. However, it is not desirable to stop the algorithm at this point. Instead, for example, only take into account a portion (e.g., the bottom third) of the computed reaches. The corresponding arcs of the selected portion are eliminated from the graph at step 975; the other two-thirds remain, and their reaches are ignored. Another iteration is performed if a predetermined condition (e.g., no remaining arcs) has not been reached at step 980; otherwise, the preprocessing phase ends at step 990. The next iteration may then add shortcuts which would not be added otherwise. These shortcuts reduce reaches of high-reach vertices and improve query performance.

Exemplary Computing Environment

Figure 11:
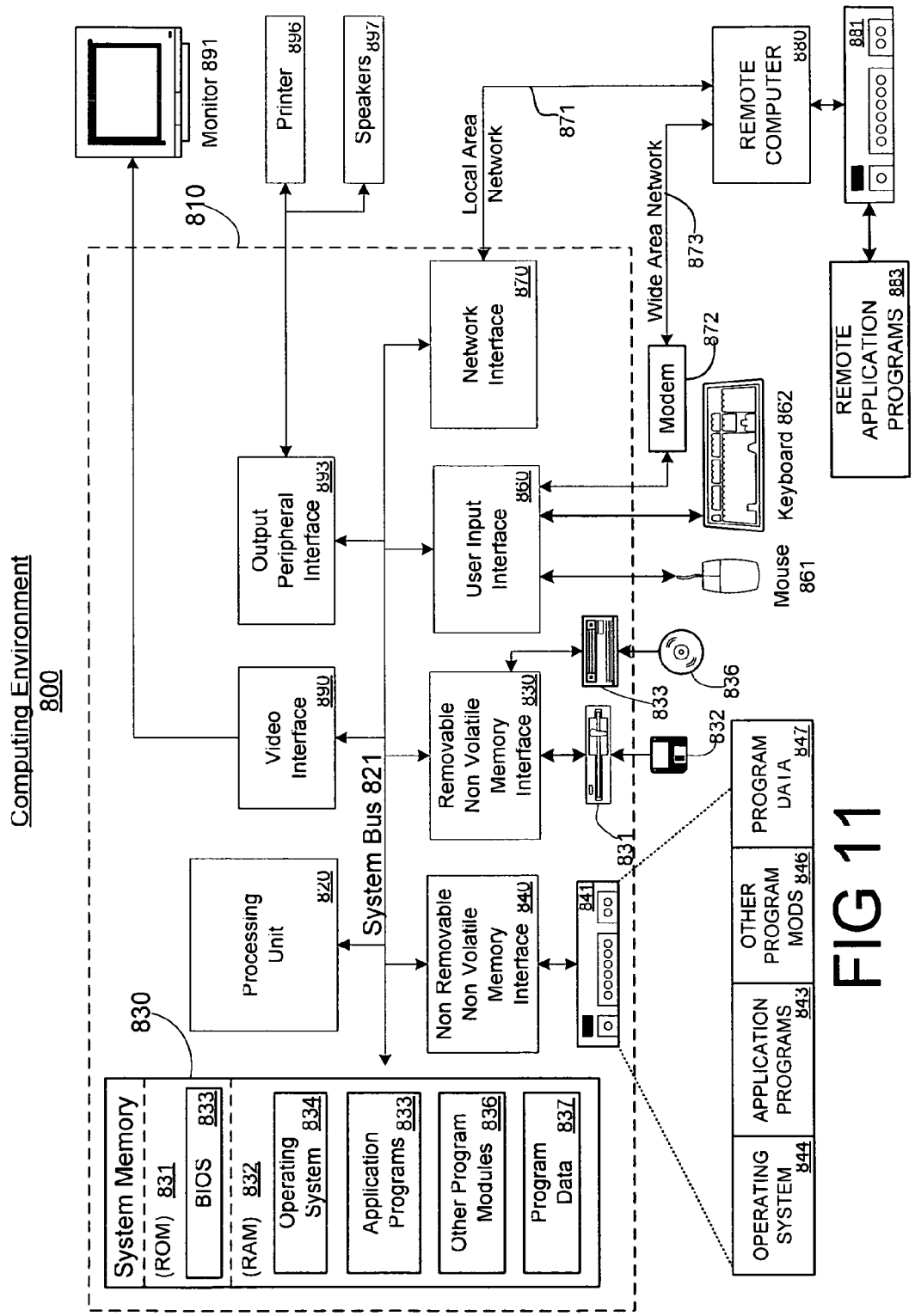
FIG. 11 is a block diagram representing an exemplary non-limiting computing device in which aspects of the present invention may be implemented.

FIG. 11 illustrates an example of a suitable computing system environment 900 in which the invention may be implemented. The computing system environment 800 is only one example of a suitable computing environment and is not intended to suggest any limitation as to the scope of use or functionality of the invention. Neither should the computing environment 800 be interpreted as having any dependency or requirement relating to any one or combination of components illustrated in the exemplary operating environment 800.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 11, an exemplary system for implementing the invention includes a general purpose computing device in the form of a computer 810. Components of computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 810 typically includes a variety of computer readable media. Computer readable media can be any available media that can be accessed by computer 810 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 810. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or non-volatile memory such as ROM 831 and RAM 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 11 illustrates operating system 834, application programs 835, other program modules 836, and program data 837.

The computer 810 may also include other removable/non-removable, volatile/non-volatile computer storage media. By way of example only, FIG. 11 illustrates a hard disk drive 840 that reads from or writes to non-removable, non-volatile magnetic media, a magnetic disk drive 851 that reads from or writes to a removable, non-volatile magnetic disk 852, and an optical disk drive 855 that reads from or writes to a removable, non-volatile optical disk 856, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media provide storage of computer readable instructions, data structures, program modules and other data for the computer 810. In FIG. 11, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies. A user may enter commands and information into the computer 810 through input devices such as a keyboard 862 and pointing device 861, commonly referred to as a mouse, trackball or touch pad. Other input devices (not shown) may include a microphone, joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 11. The logical connections depicted include a LAN 871 and a WAN 873, but may also include other networks. Such networking environments are commonplace in offices, enterprise-wide computer networks, intranets and the internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 11 illustrates remote application programs 883 as residing on memory device 881. It will be appreciated that the network connections shown are exemplary and other means of establishing a communications link between the computers may be used.

As mentioned above, while exemplary embodiments of the present invention have been described in connection with various computing devices, the underlying concepts may be applied to any computing device or system.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed is:

1. A computer-implemented method of graph preprocessing, the method comprising:
    receiving as input a graph comprising a plurality of vertices and arcs;
    recursively processing, via the computer, a set of vertices of said graph that includes vertices with high vertex reaches using an iterative process which comprises:
        adding shortcut arcs to the graph;
        eliminating one or more vertices in the graph that are bypassed by an added shortcut arc; and
    storing a preprocessed graph comprising the added shortcut arcs.

2. The method of claim 1, further comprising setting a constant value, $\alpha$, wherein the vertices in the set of the vertices comprise $1/\alpha$ of the plurality of vertices with a highest reach.

3. The method of claim 1, further comprising partitioning the plurality of vertices into two sets of vertices, wherein a first set of the vertices comprises a predetermined fraction of vertices among the plurality of vertices of the graph having a highest reach.

4. The method of claim 3, further comprising retaining the original ordering of the vertices in each of the two sets prior to the recursively processing.

5. The method of claim 4, wherein the recursively processing comprises re-ordering the first set of vertices and placing high-reach vertices close to each other in memory to optimize cache locality.

6. The method of claim 1, wherein eliminating one or more vertices comprises identifying vertices that are bypassable and eliminating bypassable vertices.

7. The method of claim 1, further comprising eliminating the arcs associated with the eliminated vertices.

8. The method of claim 1, wherein the graph represents a network of nodes.

9. The method of claim 1, wherein the graph represents a road map.

10. The method of claim 1, wherein the method is implemented for reach-based processing in a P2P (point-to-point) application.

11. A computer readable storage medium comprising program instructions that are executable by a computer to perform method steps for graph preprocessing, the method steps comprising:
    receiving as input a graph comprising a plurality of vertices and arcs;
    recursively processing a set of vertices that includes vertices with high vertex reaches using an iterative process which comprises:
        adding shortcut arcs to the graph: and
        eliminating one or more vertices in the graph that are bypassed by an added shortcut arc; and
        storing a preprocessed graph comprising the added shortcut arcs.

12. The computer readable storage medium of claim 11, further comprising program instructions for setting a constant value, $\alpha$, wherein the vertices in the first set of the vertices comprise $1/\alpha$ of the plurality of vertices with a highest reach.

13. The computer readable storage medium of claim 11, further comprising program instructions for partitioning the plurality of vertices into two sets of vertices, wherein a first set of the vertices comprises a predetermined fraction of vertices among the plurality of vertices of the graph having a highest reach.

14. The computer readable storage medium of claim 13, further comprising program instructions for retaining the original ordering of the vertices in each of the two sets prior to the recursively processing.

15. The computer readable storage medium of claim 14, wherein the program instructions for recursively processing comprise program instructions for re-ordering the first set of vertices and placing high-reach vertices close to each other in memory to optimize cache locality.

16. The computer readable storage medium of claim 11, wherein the program instructions for eliminating one or more vertices comprise program instructions for identifying vertices that are bypassable and eliminating bypassable vertices.

17. The computer readable storage medium of claim 11, further comprising program instructions for eliminating the arcs associated with the eliminated vertices.

18. The computer readable storage medium of claim 11, wherein the graph represents a network of nodes.

19. The computer readable storage medium of claim 11, wherein the graph represents a road map.

20. A computing system, comprising:
    a processing unit;
    system memory for storing a P2P (point-to-point) application program comprising program instructions that are executable by the processing unit to perform a method for preprocessing a graph, said method comprising:
        receiving as input a graph comprising a plurality of vertices and arcs;
        recursively processing a set of vertices that include vertices with high vertex reaches using an iterative process which comprises:
            adding shortcut arcs to the graph: and
            eliminating one or more vertices in the graph that are bypassed by an added shortcut arc; and
            storing a preprocessed graph comprising the added shortcut arcs.

* * * * *